Sept. 22, 1925.	1,554,485
E. M. BARRUS
BEET TOPPER
Filed Dec. 8, 1923
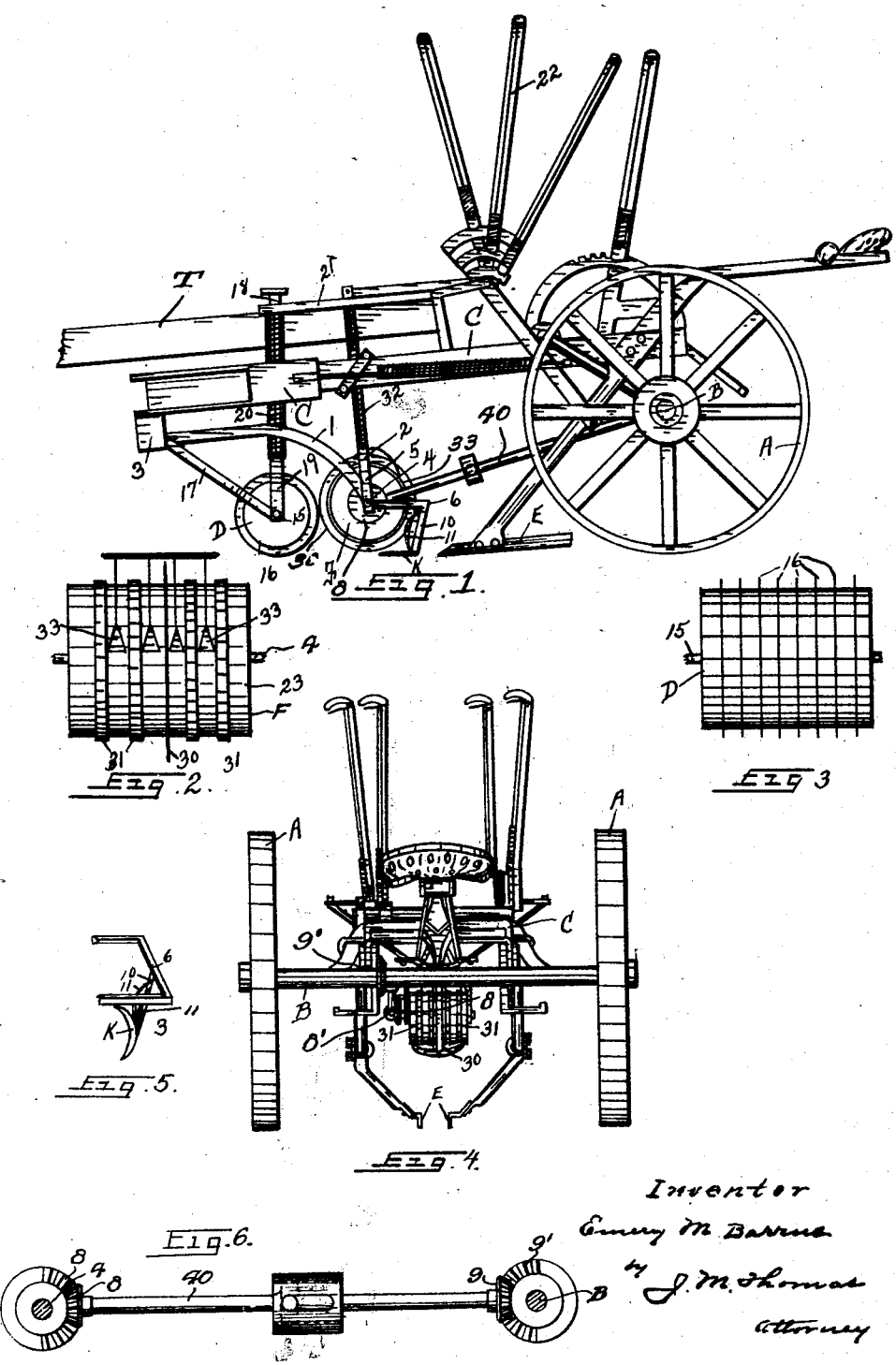

Patented Sept. 22, 1925.

1,554,485

UNITED STATES PATENT OFFICE.

EMERY M. BARRUS, OF AFTON, WYOMING.

BEET TOPPER.

Application filed December 8, 1923. Serial No. 679,494.

*To all whom it may concern:*

Be it known that I, EMERY M. BARRUS, a citizen of the United States, residing at Afton, in the county of Lincoln and State of Wyoming, have invented certain new and useful Improvements in Beet Toppers, of which the following is a specification.

My invention relates to beet topping machines and has for its object to provide a beet topper which may be attached to the frame of a beet digging implement in front or before the beet digger or plow, by which beets of different sizes and having differently positioned roots may be topped at any desired distance below the crown of each particular beet.

These objects I accomplish with the machine illustrated in the accompanying drawings, in which similar letters and numerals of reference indicate like parts throughout the several views and as described in the specification forming a part of this application and pointed out in the appended claims.

In the drawings in which I have shown a substantial embodiment of my invention, Figure 1 is a side elevation of a beet plow with my improved topper attached thereto. Figure 2 is a front elevation of the drum which controls the topping knife and by which the relative position of the knife to each beet is determined. Figure 3 is a front elevation of the foliage slicer drum. Figure 4 is a rear elevation of my machine with the foliage slicer and topping elements raised or shown above the horizontal plane of the digging elements or plows. Figure 5 is a perspective of the knife and foliage cutting blades. Figure 6 is a plan view of the shaft and gears for imparting motion to the drum.

I have shown and herein describe a simple and preferred form of my invention, it being understood, however, that slight changes and alterations and modifications may be made within the scope of the claims. The machine is mounted on ground wheels A having a common axle B which rotates with said wheels A, and a frame C is carried on said axle. A tongue T or guiding machine is shown. On the forward or front end of said frame C is mounted the foliage cutting drum D and on the rear of said frame are suspended the digging elements or plows E. Between said foliage cutting drum D and the plows E is mounted or carried the gauge drum F, which drum is drawn by the curved drawbars 1 which are connected and their rear portions vertically adjusted by the bifurcated standard 2. The drawbars 1 are pivoted at their front ends to a clevis 3 and it, in turn, is fastened to the frame C of the machine. The rear portions of said drawbars 1 are carried on the axle 4 of the gauge drum F. The extreme rear ends of said drawbars 1 are curved toward each other and secured to a vertical portion 10 of the topping element. The topping element includes the vertical portion 10 which is inclined slightly forward, and on its lower end is secured the topping knife K. The said topping knife K is on a horizontal plane and curved forwardly and sharpened to cut off the crown of the beets. Two spaced apart foliage cutting blades 11 are fastened on the said vertical portion 10 of the knife with their front edges sharpened and given arc shapes to cut all of the side branches of the foliage, and said blades 11 are positioned on opposite faces of the disk 30. The said blades 11 and disk 30 coact to center the curved knife K to each individual beet. The said foliage cutting drum D consists of a horizontally disposed metal cylinder secured on a shaft 15. On the periphery of said cylinder or drum D is secured a plurality of spaced apart cutting disks 16, preferably spaced about one inch apart, and having their edges sharpened to cut through the foliage and crown of the beets as the machine is drawn over the rows of beets, thereby cutting the foliage up more or less and leaving slits in the crown of the beets to a depth desired by the operator. The said foliage drum is drawn with the drawbars 17, which bars have one end journalled on the axle 15 of said drum and the other end secured to the clevis 3. A vertically disposed standard 18, with its lower portion bifurcated, as at 19, is supported on said shaft 15 and operatively carried in said frame C. A spiral spring 20 is carried on said standard 18 with its upper end bearing against an arm 21 of a hand lever 22. The lever 22 is the means for giving the desired tension on the spring 20 and also to raise the drum D clear of the ground when desired to move the machine from one field of beets to the other. The said gauge drum F consists of a metal cylinder 23 which is mounted on another horizontally disposed shaft or axle 4 which is journalled in the lower portion of said standard 2 and also in said drawbars 1, and on said shaft 4 is secured a beveled gear 8 which is operatively connected by pinions and universally jointed shaft with the main axle B. A foliage splitting disk 30 is secured medially on said drum F and adjusting bands 31 are also fastened on said drum. The said bands 31 are spaced apart, and from said splitting disk 30, to provide spaces through which the foliage of the beets may pass as said drum is rolled over the foliage. A spring 32 is carried on said standard 2 to press the drum F downward and by its tension to add to the weight of said drum in mashing the foliage down and in assuring the topping of the beets by the knife at the desired depth. Scraper blades 33 are mounted above said drum F on the standard 2 and each of said blades 33 contacts with the periphery of said drum between the gauge bands 31 to scrape mud or other matter which may be caught on the drum as it is rotated. The drums D and F are both rotated by the friction of the soil and foliage, but if desired, the drum F may be rotated by the train of gears and shaft 8, 9 and 40 connected with the main axle B. The said train of gears consists of the said bevel gear 8 with its intermeshing pinion 8', the shaft 40, and the pinion 9 with its intermeshing gear 9', the pinions 8' and 9 are both secured on the universally jointed shaft 40. Hand levers are provided by which the plows E and the drum F may be raised clear of the ground when moving the machine from one field to another. The outer face of each of said bands 31 is roughened or transversely corrugated to engage the foliage or soil, and in most use the friction of the drum will rotate it, but when the soil is soft or slippery the train of gears in connection with the main axle may be used to rotate said drum F.

Having thus described my invention, I desire to secure by Letters Patent and claim:—

1. A beet topper comprising a wheel supported frame, a rotatable drum suspended from said frame and connected therewith by a vertically movable standard and drawbars; a foliage splitting disk secured on and rotating with said drum; spaced apart adjusting bands fastened on the periphery of said drum; and a topping knife fastened to the rear ends of said drawbars adjacent said drum.

2. A beet topper comprising a wheel supported frame; a drum suspended from said frame; drawbars connected with said frame between which said drum is mounted; a bifurcated standard also connecting said drum and said frame; a foliage splitting disk secured on and rotating with said drum; spaced apart bands secured around said drum; a topping knife secured to the rear portions of said drawbars and moved vertically and laterally with said drum; and means to rotate said drum from the axle of said supporting wheels.

In testimony whereof I have affixed my signature.

EMERY M. BARRUS.